Oct. 20, 1936.  J. W. ROBERTS  2,058,261
PISTON
Filed Feb. 20, 1935

INVENTOR
James W. Roberts
BY
ATTORNEY

Patented Oct. 20, 1936

2,058,261

UNITED STATES PATENT OFFICE 2,058,261

PISTON

James W. Roberts, Ben Hill, Ga.

Application February 20, 1935, Serial No. 7,409

4 Claims. (Cl. 309—15)

This invention relates broadly to compression devices, and more particularly, to a new and improved piston for combustion engines and the like.

The conventional internal combustion engine comprises one or more cylinders in which reciprocates a piston or pistons, the space above each piston between the side walls and closed top of the cylinder comprising a combustion chamber, in which a mixture of fuel (gasoline) and air is compressed and then exploded in such a manner as to drive the piston downwardly, thereby revolving a crank-shaft to which said piston is connected by means of an intermediate piston rod. Since the piston must reciprocate in the cylinder, and since the combustion chamber must be as nearly air-tight as possible, the problem of sealing the piston with the walls of the cylinder is a very important one, and in fact, the efficiency of a given engine may be said to vary in direct proportion with the effectiveness of the joint between piston and cylinder. For example, as this seal fails, compression is reduced, with a resulting loss of power and lower gasoline mileage; oil consumption is increased, since the oil in the crank-case now filters through into the combustion chamber and is there burned with the regular fuel mixture; and particles of raw fuel in said chamber are permitted to pass downwardly into the crank-case, thereby diluting the oil therein and lowering the quality thereof, with a result that improper lubrication is furnished the working parts of the engine and unnecessary wear then occurs, the result being to shorten the effective life of the machine.

Various expedients have been resorted to in providing a seal between the piston and cylinder wall, the generally accepted method being to provide the piston with one or more expansible metal rings which fit into grooves provided for that purpose around the peripheral walls of the piston, and which by virtue of their resilient nature tend to provide an effective joint. An objection to piston rings generally, however, lies in the fact that while they may be reasonably effective for the purpose intended when the engine is new, said rings become worn during the counties reciprocations the piston must make when the engine is in use; and that the effectiveness of the rings may be further impaired in the course of time by the terrific heat encountered in the motor, which heat tends to distort the metal of the rings and otherwise change or modify the desirable characteristics thereof existing when the article is newly installed. A further consideration lies in the fact that the walls of the cylinders themselves wear away as the machine is used, this situation finally necessitating the installation of new pistons and new rings if said use continues long enough.

An object of this invention is to provide a piston that will always insure perfect compression within a device of the character described.

Another object is to provide a piston that automatically adapts itself to wear within its own structure so as to always provide a tightly sealed joint with the walls of a cylinder with which it is associated.

Another object is to provide in a device of the instant type, a structure that automatically adapts itself to wear in the walls of an associated cylinder, in such a manner as to always tightly seal with said wall regardless of the extent of said wear.

A still further object is to provide a piston that automatically seals itself against loss of power on its down-stroke.

A still further object is to assemble the packing ring elements at break joints between the bevelled relatively movable ends of the packing groove so that as the groove is contracted under the compression and power strokes the packing assembly will be forced outwardly as a whole while oil trapped under the packing in the contracting groove will escape freely from the joint between the head and skirt into the skirt.

Another object is to provide cheapness of construction and simplicity of operation in a device of the instant character.

Another object is to conserve oil and gasoline through the employment of a device insuring perfect compression within a combustion engine.

Another object is to promote longevity of engines and engine parts by preventing dilution of crank-case oil, through the use of my invention.

These and other objects made apparent throughout the further progress of this specification are accomplished by means of the instant invention, a full and complete understanding of which is made possible by reference to the drawing herein, in which.

Like numerals indicate corresponding parts throughout the various figures of the drawing.

Figure 1:
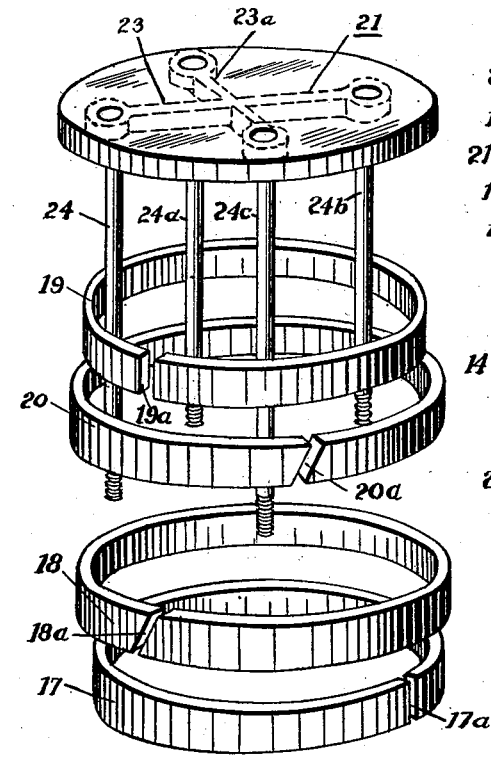
Fig. 1 is an exploded view in perspective of a device embodying my invention, illustrating the various elements in dissembled form.

Referring now to the drawing, Fig. 1, my invention comprises an annular ring or piston 10 of suitable diameter to fit snugly into a cylinder with which it is intended to be associated. Conventional anchoring members 11 and 12 are provided in the interior of 10 to receive a connecting rod and bearings.

Special attention is now directed to the upper portion 13 of 10, which is of a smaller diameter than the lower portion 14, this being accomplished as by machining a ledge at 15 and from this point cutting away the upper peripheral wall of the piston at a uniform diameter to the upper edge thereof. It is to be especially noted that the ledge 15 does not form a right angle with the vertical axis of the piston, but rather, that is tapers slightly upwardly from a point 16 on the piston so as to form a somewhat smaller angle with this imaginary axis, the resulting structure being a sloping ledge between 13 and 14.

Associated with 10 is a double sealing member comprising an inner expansible band 17 slit vertically as at 17a, and an outer expansible band 18 having an oblique slit 18a, the inner circumference of 18 seating snugly with the outer circumference of 17. The lower portions of 17 and 18 are machined at an angle complementary to that of ledge 15, so that when the said double sealing member is in operative position a tightly fitting though expansible joint is provided between said member and the ledge, it being further contemplated that the outer walls of said sealing member shall lie in substantially the same vertical plane as the corresponding walls of 14.

A second expansible sealing member is placed above the first, this element comprising an inner expansible resilient band 19 and an outer band 20, said bands having spacing slots 19a and 20a, and the under sides of said bands being preferably formed straight and at right angles to their axes so as to seat snugly with a similar construction on the upper sides of 17 and 18. Attention is directed to the upper sides of 19 and 20, which are sloped at an angle similar to that of the under sides of the lower sealing elements, the purpose of such construction being made clear elsewhere herein.

Figure 3:
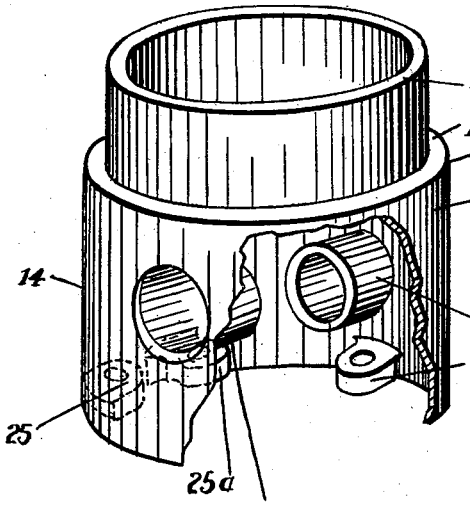
Fig. 3 is an enlarged fragmentary vertical cross-sectional view taken through the center of a piston embodying my invention, illustrating in detail certain features thereof, including the manner in which the sealing elements seat with the side of the piston and its cap.
Figure 3:
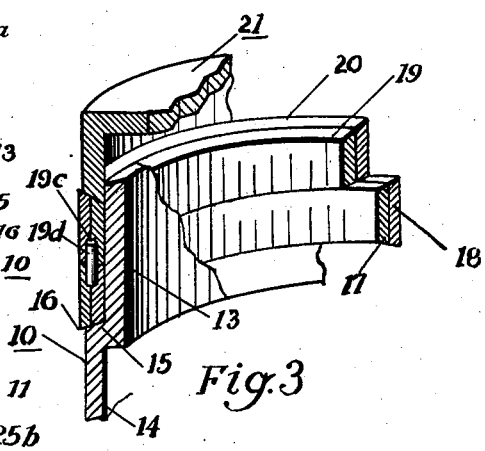

If desired, in order to prevent the bands from turning in such a manner that the slits of concentric bands register with each other and/or with similar portions of adjacent bands, said elements may be drilled as at 19c (Fig. 3) to receive a pin 19d, which maintains the bands in proper relative position.

Figure 2:
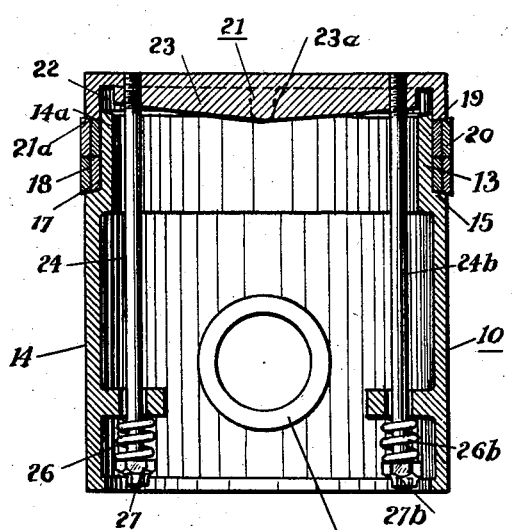
Fig. 2 is a vertical cross-sectional view taken through the middle of a piston embodying my invention.

Attention is now directed to the head or cap 21 of my piston. This element may resemble the head or top of a conventional piston, with the exception that the interior portion of the underside thereof is hollowed out as at 22 to provide a smoothly seating arrangement with the upper portion 14a of 10. The outer portion of the underside of 21 is sloped as at 21a to provide a smooth angular surface that is complementary to the upper side of 19 and 20 and registers snugly therewith (Fig. 2). The interior of the cap may be reinforced as by being provided with cross-ribs 23 and 23a, which members are deemed desirable in view of the strain and heat placed upon the head of the piston during operation in an internal combustion engine. It is obvious, of course, that said ribs may be cast with the cap, or provided in any other suitable manner; which likewise applies to the construction of the entire device herein, I not being concerned with any method of construction, but rather with the structure per se.

Cap 21 may be provided with a series of downwardly extending studs 24, 24a, 24b, and 24c, which studs are securely anchored at their tops to said cap, and which are of a sufficient length to extend through holes provided for that purpose in a series of engaging bosses 25, 25a, 25b, and 25c, cast on the inside of 10. Tensioning valve springs 26, 26a, 26b, and 26c, are passed over the studs on the under side of the bosses, and the ends of said studs are threaded to receive castellated nuts 27, 27a, 27b, and 27c, which nuts provide for varying the tension in the springs, and hence the tension with which cap 21 seats with the top of 10.

When assembled as indicated in Fig. 2, and installed in an engine (not shown), the operation of my piston is as follows: When an explosion occurs in the combustion chamber above 21, such as to drive the piston downwardly, a force is transmitted to expansible elements 17 and 18 through intermediate bands 19 and 20, such as to tend to force said elements, and particularly 18 thereof, outwardly, by virtue of the downwardly sloping structure of ledge 15 with which 17 and 18 register. The extent of this expansion will be determined in each instance by the relative gap existing between the peripheral edge of 18 and the inner wall of the cylinder with which it is associated, but it is apparent that under all operating conditions, and regardless of the increasing wear of the elements, this gap is always completely, tightly, and efficiently closed on the down stroke of the piston, this operating being accomplished automatically by my invention in utilizing the force of the explosion above to effect this result.

On the up or compression stroke of the piston a somewhat similar action occurs in elements 19 and 20, which expansible elements tend to be forced outwardly along the sloping surface provided at 21a, this action effecting a thoroughly efficient sealing means and thereby guarantees maximum compression at all times.

On the piston's suction stroke the packing groove will expand as its bevelled end walls tend to separate and on its power and compression strokes the groove will contract, and any oil trapped in it under the packing assembly will escape through the telescoping joint between piston head and skirt and pass freely and immediately over the narrow top edge of the skirt and return to the crank case without being held in close clearances where it might carbonize quickly.

Cap 21 and associated springs provide a smoothly functioning compensating and driving element, which by virtue of its connection with the top of 10 in the manner described herein effects a sealing action in conjunction with the piston, with attendant beneficial results as aforesaid.

While I have described my invention primarily in connection with an internal combustion engine, it is to be noted that I do not intend to thereby limit myself to this use, but on the contrary intend that I shall be accorded protection on every conceivable use to which a piston of the type disclosed by me, can be put. For example, my invention is of inestimable value when used in an air compressor, a steam engine, or in any device where super compression is desirable.

From the foregoing it is apparent that I have disclosed a new and improved piston, which invention makes perfect compression possible, with attendant economic savings as aforesaid. When employed in an internal combustion it saves oil and gasoline by insuring uniformly high quality compression at all times, regardless of the extent of wear of cylinder walls or pistons, and that it prolongs the life of the motor by preventing dilution of crank-case oil, with attendant deterioration of the lubricating qualities thereof. It is further apparent that my device is simple and economical in construction, positive in its action, and thoroughly adapted for all intended purposes.

Although a specific form of my invention has been described in detail herein, I do not limit myself thereby, since certain changes, omissions, additions, and the like will suggest themselves to anyone skilled in a given art, in adapting my invention to a specific machine; but intend that the appended claims shall be accorded a broad construction and a liberal range of equivalents in keeping with my contribution in this field.

I claim:

1. An internal combustion engine piston, comprising a skirt member carrying the wrist pin bearings and having its head end left open and externally reduced to form a packing groove, a head member telescoping over said reduced portion, means including springs to yieldably connect said head and skirt, an assembly of split packing rings mounted in said packing groove and adapted to hold the head clear of the adjacent open end of said skirt, means to maintain the packing rings in said assembly in break joint relationship, and oppositely bevelled end walls on said head and skirt adapted to engage and expand the whole packing ring assembly outwardly whereby oil trapped within the groove may pass into the skirt through the telescoping joint between the head and reduced portion of the skirt.

2. An internal combustion engine piston, comprising a skirt member carrying the wrist pin bearings and having its head end left open and externally reduced to form a packing groove, and a head member telescoping over said reduced portion, means including springs to yieldably connect said head and skirt, an assembly of split packing rings mounted in said packing groove and adapted to hold the head clear of the adjacent open end of said skirt, means to maintain the packing rings in said assembly in break joint relationship, and oppositely bevelled end walls on said head and skirt adapted to engage and expand the whole packing ring assembly outwardly, whereby oil trapped within the groove may pass into the skirt through the telescoping joint between the head and reduced portion of the skirt, the means for maintaining the rings at break joints being a single axially disposed pin which engages all the rings.

3. A piston comprising a skirt member having wrist pin bearings and an annular head end left open and provided with an external packing groove, a head member having a flange which telescopes over the grooved end of said skirt, said head and skirt having reversely bevelled end walls for said groove, means including springs to connect said skirt and head free for relative axial play, and an assembly of packing rings interposed in said groove between said bevelled walls and comprising end sets of split bands, each set having inner and outer bands which are nested and bevelled at one end complementary to the adjacent bevelled end wall of the packing groove which both rings are adapted to engage, the adjacent ends of the ring sets being shaped to abut in a plane normal to the piston axis, and means to maintain the slits in said rings at break joints, said skirt and head affording a free escape for oil trapped under the packing ring assembly as the packing groove is contracted.

4. A piston comprising a cylindrical skirt having wrist pin bearings and an annular head end which is left open and unobstructed internally and which is externally reduced in diameter to provide a packing groove formed with a bevelled lower end wall, a piston head formed with a reversely bevelled flange adapted to telescope over said reduced skirt end and provide an upper end wall for said packing groove, means including springs to connect said head and skirt free for relative axial play, and a ring assembly mounted in said groove comprising an upper pair of split nested rings bevelled at one edge and adapted to engage the upper groove wall, a similar pair of lower rings bevelled and adapted to engage the lower groove wall, and an axially disposed key adapted to engage all rings of the assembly and maintain their slits at break joints as the rings work between their relatively movable groove walls.

JAMES W. ROBERTS.